(No Model.)

3 Sheets—Sheet 1.

A. FRAGER.
WATER METER.

No. 297,922.  Patented Apr. 29, 1884.

WITNESSES:

INVENTOR:
Alphonse Frager
By his Attorneys, (No Model.)
3 Sheets—Sheet 2.
A. FRAGER.
WATER METER.
No. 297,922. Patented Apr. 29, 1884.
Fig. 2.
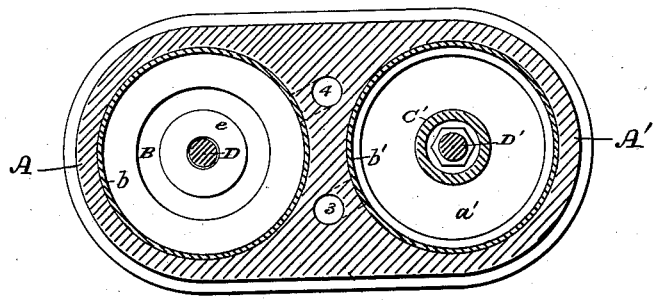
Fig. 3. Fig. 4. Fig. 5.
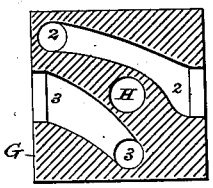 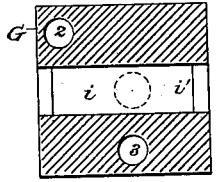 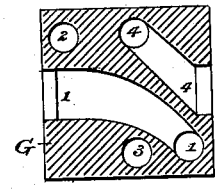
Fig. 6. Fig. 7. Fig. 8.
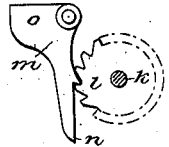 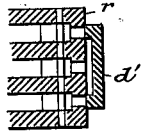 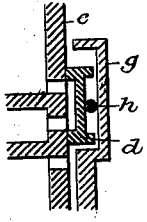
WITNESSES:
E. B. Bolton
Geo. H. Fraser
INVENTOR:
Alphonse Frager
By his Attorneys,
Burke, Fraser & Cornell (No Model.) 3 Sheets—Sheet 3.

A. FRAGER.
WATER METER.

No. 297,922. Patented Apr. 29, 1884.

WITNESSES:

INVENTOR:

UNITED STATES PATENT OFFICE.

ALPHONSE FRAGER, OF PARIS, FRANCE, ASSIGNOR OF ONE-HALF TO SOCIÉTÉ MICHEL ET CIE., OF SAME PLACE.

WATER-METER.

SPECIFICATION forming part of Letters Patent No. 297,922, dated April 29, 1884.

Application filed February 16, 1884. (No model.) Patented in France November 9, 1882, No. 152,009.

*To all whom it may concern:*

Be it known that I, ALPHONSE FRAGER, a citizen of the French Republic, and a resident of Paris, France, have invented certain Improvements in Fluid-Meters, of which the following is a specification.

My invention relates to a piston-meter for measuring the quantities of fluids under pressure or head which are caused to pass through it. It is especially designed to serve as a water-meter for cities where the water is supplied to houses under a head or pressure. My meter is very simple, and comprises two measuring-cylinders and their pistons, and each piston acts directly to operate the valve which admits the fluid to and permits it to flow from the other or adjacent cylinder. The cylinders are double-acting—that is, the pistons displace a charge of water at each end of the cylinder. The pistons move in alternate order. A simple register or recorder is employed to record the amount of water which passes, and means are provided for testing the integrity of the meter, to ascertain if the piston-packings are leaking.

Figure 1:
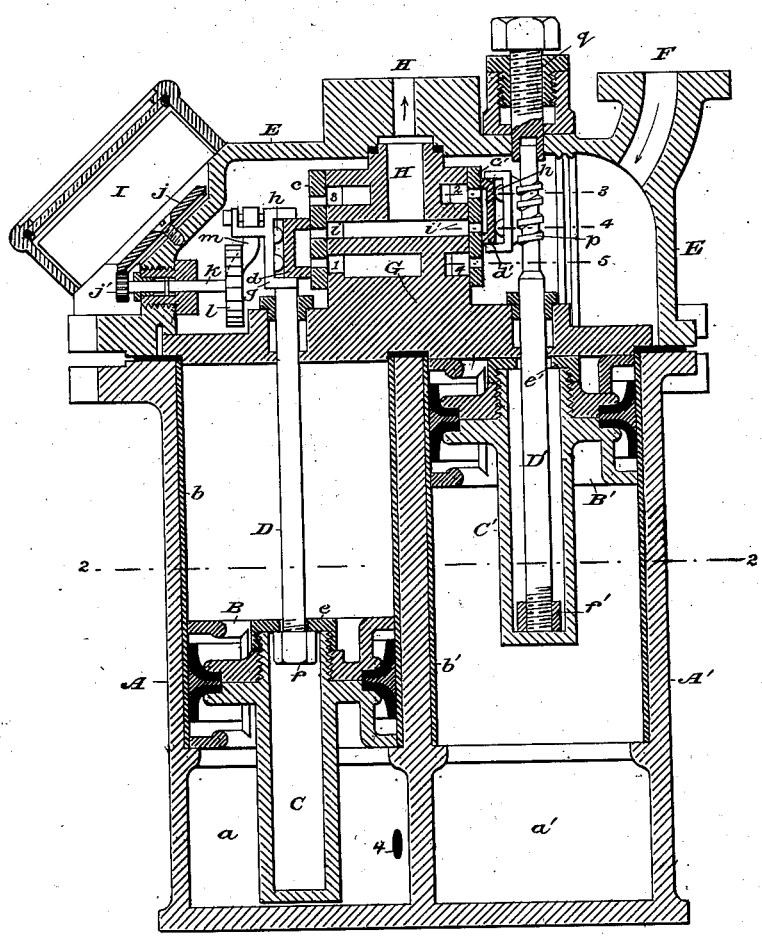
Figure 9:
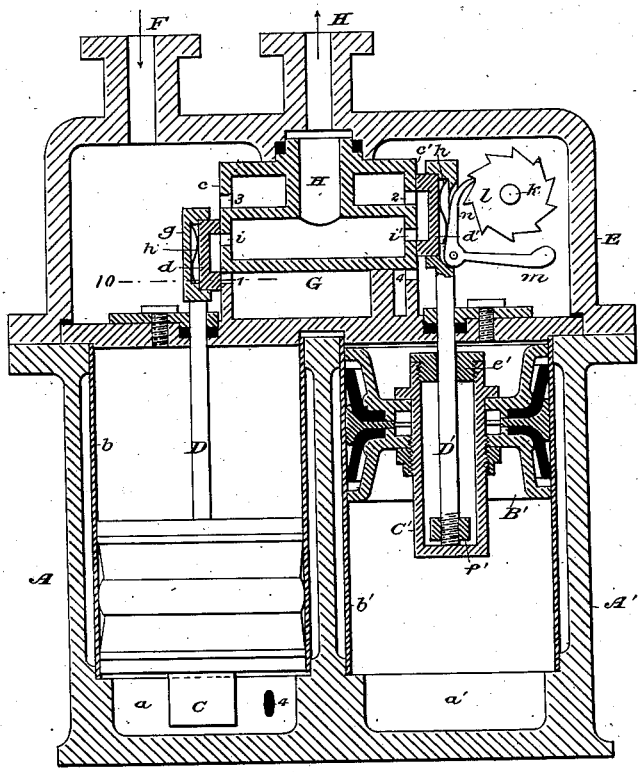
Figure 10:
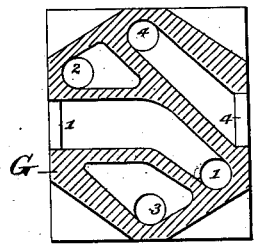

In the drawings which serve to illustrate my invention, Figure 1 is a vertical mid-section through the meter in the axes of the cylinders. Fig. 2 is a cross-section on line 2 2 in Fig. 1.
Figs. 3, 4, and 5 are respectively horizontal sections of the port-chamber on the levels of the lines 3 3, 4 4, and 5 5 in Fig. 1, designed to illustrate the arrangement of the ports and port-passages. Fig. 6 is a detached view of the pawl-and-ratchet device whereby the recording is effected. Fig. 7 illustrates a modification which will be referred to hereinafter. Figs. 8, 9, and 10 illustrate modifications which will be hereinafter described.

A and A' are two cylinders, preferably cast in one piece, and provided with chambers $a\ a'$ at their lower or outer ends, and sheet-metal cylindrical linings $b\ b'$. B and B' are pistons arranged in these cylinders. These are made of sufficient length to cause them to move steadily. In the axes of the pistons are fixed trunks C and C', in which play rods D and D', which perform the functions of valve-stems. On the upper or inner ends of the cylinders is mounted a fluid-receiving chamber, E, provided with an inlet, F. Within this chamber is mounted or fixed what I will call the "port-chamber" G, in which are arranged the various ports and passages through which the fluid flows to and from the measuring-cylinders.
H is a fluid-outlet from this chamber. On the opposite sides of chamber G are arranged the ported valve-seats $c\ c'$, and on these seats rest and play slide-valves $d$ and $d'$—one for each cylinder. As the pistons act directly to move the valves, and as the stroke of the valve is much less than that of the piston, I provide the means I will now describe for getting rid of the surplus motion. The valve-stem D (for example) enters the trunk C of piston B, and a cap, $e$, is screwed onto the trunk. The stem has a button, $f$, or other enlargement on its inclosed end, which prevents it from being drawn out of the trunk. The stem passes up through a stuffing-box in the cylinder-cover, and is provided at its end with a claw or clamp, $g$, which takes over the valve. The stroke or play of the piston equals the play of the stem in the trunk plus the movement or displacement of the valve. The valve is held up to its seat by a spring, $h$, which may be of steel, rubber, or any other elastic material.

I will now describe the operation of the meter before proceeding to describe any of the remaining parts.

As before stated, the valve actuated by one piston controls the movements of the adjacent piston. I have numbered the receiving ports and passages 1, 2, 3, and 4. The arrangement of these is best illustrated in Figs. 2, 3, 4, and 5. Port-passages 3 and 4 respectively admit the fluid to the cylinders A' and A below the pistons, and port-passages 1 and 2 respectively admit it to the cylinders above the pistons.
Valve $d$ controls ports 1 and 3, and valve $d'$ controls ports 2 and 4. Piston B' is at the upper or inner end of its stroke, and has just uncovered port 4, which admits the fluid under piston B. This latter piston rises and forces the fluid above it out through port 2 under valve $d'$, and in through exhaust-port $i$ and out through H. When piston B reaches the end of its up or out stroke, it will have uncovered port 1 and admitted the fluid to cylinder A' above piston B'. This piston will move down and force the fluid below it out through port 3 under valve $d$, in through exhaust-port $i$, and out through H. This action is kept up indefinitely, one piston standing until the other completes its stroke.

Mounted on the receiving-chamber E is a case, I, which is designed to contain the usual mechanism for registering or recording the quantity of fluid which passes through the meter. I have not shown this mechanism in full, as I do not claim it herein. The case I is mounted so that its face stands at an angle of about forty-five degrees, in order that the record may be read easily, and has a glass front plate. The registering mechanism may be driven from any suitable gear-wheel, $j$, and this wheel is driven through the medium of a pinion, $j'$, on a shaft, $k$, which shaft bears a ratchet-wheel, $l$, that is driven intermittently by a pawl, $m$, borne by the claw on stem D of one of the valves. This pawl-and-ratchet device is shown detached in Fig. 6. As there are two pistons and cylinders, and as only one of these actuates the recording mechanism, it is obvious that the register should record double. I so proportion the parts that when the ratchet-wheel $l$ has advanced one tooth the mechanism will record a quantity of fluid equal to the displacement of both cylinders. The pawl is arranged to move more than far enough to engage one tooth, but is prevented from engaging two or more teeth by the pendent tail $n$, (see Fig. 6,) which rests on the teeth of the wheel and prevents the inward swing of the pawl. The latter is kept in engagement by a weight, $o$, or other equivalent device. For some liquids—as oil or alcohol—a spring may be used; but water is apt to rust and injure a steel spring.

Where it is desired to give the pawl more movement than the valve has, this may be attained with the construction shown in Fig. 8. In this case the claw $g$ on the stem D has a recess on its under side, which is considerably longer than the valve, and the valve is recessed on its back to receive a spring, $h$, in the nature of a rubber ball. The operation will be obvious. Where the difference between the stroke of the piston and that of the valve is not too great, this device may also be employed as an equivalent of the trunk C; but I prefer the trunk.

I will now describe the means employed for testing the meter to ascertain if the packings of the pistons leak. This is shown at the right in Fig. 1. The valve-stem D' is not connected rigidly to the claw $g'$, but is provided with a screw, $p$, which engages a half-nut on the back of the claw. The rod extends upward, and has a square on its upper end, that engages a socket in a key, $q$, which screws down through the top of chamber E, directly over the stem. The stem may be rotated by means of this key, and this will run the valve up or down and throw it out of adjustment with reference to its ports. In Fig. 1 valve $d'$ stands in its normal position at the end of its upward movement. One turn of the valve-stem D' runs the valve down until port 2 is uncovered. This arrests the movement of the piston B', and the flow immediately ceases if the packing is tight. Now, as the pressure is on the lower face of piston B' and the upper face of piston B, and the pressure is relieved from the opposite sides of same, this tests the tightness of the cylinder-packing when the pressure is exerted against these faces. Now, to test the integrity of the packing when the presssure is exerted on the other faces, I operate as follows: One turn back brings the valve again to its normal position and sets the meter in operation. Another turn in this direction displaces the valve inversely to the first turn given, and the piston B' stops at the outer or lower end of its stroke, and B at the upper. This tests the packing with the pressure on the upper face of B' and the lower face of B. I may accomplish these same results by the means indicated in Fig. 7, where $r$ is a ported plate arranged to slide between the valve and the valve-seat proper. The object is to displace the valve with respect to the ports, and this may be effected by moving the valve or its seat.

Figs. 9 and 10 illustrate my meter in a somewhat simpler form and deprived of the testing mechanism last described. The operation of the pistons and valves is the same as in that described.

I prefer to cast the port-chamber G and the cover for the cylinders all in one piece, as shown. The fluid may flow all around the chamber G within E.

Some departure may be made from the construction herein shown—as, for example, the screw $p$ might be made to engage a half-nut formed directly on the back of the valve. I might also use a rotary or oscillatory valve in lieu of a slide-valve.

In order to distinguish between what is new and what is old in the meter I have described, I will say that it is not new with me, broadly, to arrange the piston in one cylinder to actuate the valve which controls the ports leading to the other cylinder, nor to employ means for adapting the long stroke of the piston to the short stroke of the valve. It is also old to drive the recording mechanism from the valve through the medium of a pawl and ratchet. Therefore I do not broadly claim these features.

Having thus described my invention, I claim—

1. The combination of the piston provided with a trunk, the valve-stem provided with a button on one end and a claw on the other, the valve, and a spring arranged between the claw and the valve, all substantially as set forth.

2. In a fluid-meter comprising two cylinders, two pistons, two valve-seats, and two valves actuated directly by the pistons, the valve actuated by one piston controlling the ports leading to the cylinder containing the other piston, the means, substantially as herein described, for displacing the valve with reference to its ported seat, whereby the integrity of the meter, as to leakage, may be tested, as set forth.

3. The combination of the piston, the valve, the valve-stem provided with a screw, $p$, arranged to engage a half-nut carried by the valve, and the key $q$, arranged to engage and turn the end of the valve-stem, substantially as and for the purposes set forth.

4. The combination, with the ratchet-wheel $l$, of the pawl $m$, provided with a tail, $n$, to prevent the engagement of more than one tooth, the valve, and the valve-stem provided with a claw to embrace the valve, all arranged substantially as set forth.

In witness whereof I have hereunto signed my name in the presence of two subscribing witnesses.

ALPHONSE FRAGER.

Witnesses:
 ARMENGAUD, Jeune,
 EDWARD P. MACLEAN.